United States Patent
Haruyama

(10) Patent No.: US 7,995,179 B2
(45) Date of Patent: Aug. 9, 2011

(54) ELECTRO-OPTICAL DEVICE AND ELECTRONIC APPARATUS SELECTIVELY REFLECTING AND TRANSMITTING CIRCULARLY POLARIZED LIGHT HAVING REVERSE ROTATION DIRECTIONS

(75) Inventor: Akihide Haruyama, Suwa (JP)

(73) Assignee: Sony Corporation, Tokyo (JP)

( * ) Notice: Subject to any disclaimer, the term of this patent is extended or adjusted under 35 U.S.C. 154(b) by 365 days.

(21) Appl. No.: 12/245,791

(22) Filed: Oct. 6, 2008

(65) Prior Publication Data

US 2009/0109381 A1    Apr. 30, 2009

(30) Foreign Application Priority Data

Oct. 25, 2007  (JP) ................. 2007-277758

(51) Int. Cl.
  *G02F 1/141* (2006.01)
  *G02F 1/1335* (2006.01)
(52) U.S. Cl. ............... 349/133; 349/98; 349/99
(58) Field of Classification Search .......... 349/44, 349/133, 172, 175, 185, 96, 99
See application file for complete search history.

(56) References Cited

U.S. PATENT DOCUMENTS 4,818,076 A * 4/1989 Heppke et al. ................ 349/167
2005/0185105 A1* 8/2005 Miyachi et al. ................ 349/24

FOREIGN PATENT DOCUMENTS

JP     2000-275605    10/2000

* cited by examiner

*Primary Examiner* — Mark A Robinson
*Assistant Examiner* — Paul C Lee
(74) *Attorney, Agent, or Firm* — K&L Gates LLP

(57) ABSTRACT

An electro-optical device includes, a first substrate, a second substrate, an electrooptic material layer, an illuminating device, and a polarizing device. The electrooptic material layer is held between the first substrate and the second substrate. The illuminating device irradiates illumination light to an outer surface of the first substrate. The polarizing device is provided on the outer surface of the first substrate. The electrooptic material layer exhibits optical isotropy when no electric field is applied, and, when an electric field is applied, exhibits optical anisotropy corresponding to the magnitude of the electric field. The electrooptic material layer further has a characteristic to selectively reflect a first circularly polarized light having a first rotation direction. Light that passes through the polarizing device is a second circularly polarized light that has a second rotation direction reverse to the first rotation direction of the first circularly polarized light.

12 Claims, 4 Drawing Sheets

ELECTRO-OPTICAL DEVICE AND ELECTRONIC APPARATUS SELECTIVELY REFLECTING AND TRANSMITTING CIRCULARLY POLARIZED LIGHT HAVING REVERSE ROTATION DIRECTIONS

RELATED APPLICATIONS

The present application is based on, and claims priority from, Japanese Application Number 2007-277758, filed Oct. 25, 2008, the disclosure of which is hereby incorporated by reference herein in its entirety.

BACKGROUND

1. Technical Field

The present invention relates to an electro-optical device and an electronic apparatus.

2. Related Art

An electro-optical device that uses electronic polarization due to Kerr effect is known. The Kerr effect is a phenomenon that, when an electric field is applied, exhibits optical anisotropy which has an axis in the direction of the electric field and of which the degree is proportional to the square of the magnitude of the electric field. A known electrooptic material that exhibits the above Kerr effect is a liquid crystal material called a blue phase, for example. It has been known that a liquid crystal device (see JP-A-2000-275605) that employs a blue phase as a liquid crystal layer has a quick response speed. The blue phase exhibits optical isotropy when no electric field is applied, and exhibits optical anisotropy that is proportional to the square of the magnitude of an electric field applied under a predetermined temperature range.

Here, the liquid crystal material that exhibits a blue phase selectively reflects (selective reflection) circularly polarized light that advances toward the liquid crystal layer and that has the same rotation direction as the turning direction of the helix of the liquid crystal material. The wavelengths of selectively reflected light depend on the helical pitch and average refractive index of the liquid crystal material. Thus, when the wavelengths of selectively reflected light fall within visible light range, light that passes through the liquid crystal layer is colored by the liquid crystal layer.

Incidentally, the liquid crystal layer contains an additive chiral agent in order to improve development of a blue phase and scattering characteristics of a pseudo-isotropic phase. When the amount of additive chiral agent exceeds a predetermined amount and the helical pitch becomes short (shorter than or equal to 500 nm), a blue phase appears. In addition, as the amount of additive chiral agent is increased, the wavelengths of selectively reflected light become short.

In the above existing liquid crystal device, however, the following problems remain unsolved. That is, as the amount of the additive chiral agent is increased to set the selectively reflected wavelengths to a shorter wavelength side with respect to the visible light range, the chiral agent is deposited. In addition, since the saturation voltage of a cholesteric blue phase is shifted to a high voltage side, an electric field of a higher magnitude is required to drive the cholesteric blue phase. Furthermore, even when the selectively reflected wavelengths are set to a shorter wavelength side with respect to the visible light range, the selectively reflected wavelengths are shifted into the visible light range because of a change in temperature and, as a result, may decrease the contrast.

SUMMARY

An advantage of some aspects of the invention is that it provides a solution to at least a portion of the above problems. An aspect of the invention employs the following configuration. That is, an aspect of the invention provides an electro-optical device. The electro-optical device includes, a first substrate, a second substrate, an electrooptic material layer, an illuminating device, and a polarizing device. The electrooptic material layer is held between the first substrate and the second substrate. The illuminating device irradiates illumination light to an outer surface of the first substrate. The polarizing device is provided on the outer surface of the first substrate. The electrooptic material layer exhibits optical isotropy when no electric field is applied, and, when an electric field is applied, exhibits optical anisotropy corresponding to the magnitude of the electric field. The electrooptic material layer further has a characteristic to selectively reflect a first circularly polarized light having a first rotation direction. Light that passes through the polarizing device is a second circularly polarized light that has a second rotation direction reverse to the first rotation direction of the first circularly polarized light.

In the above aspect of the invention, by making the circularly polarized light passing through the polarizing device be a circularly polarized light having a rotation direction which is not selectively reflected by the electrooptic material layer, it is possible to prevent selective reflection regardless of the amount of additive chiral agent. Thus, an increase in the driving voltage is suppressed, and a decrease in contrast due to a change in temperature is prevented. That is, the circularly polarized light transmitted through the polarizing device is a circularly polarized light having a rotation direction that is not selectively reflected by the electrooptic material layer. Thus, the above circularly polarized light is not selectively reflected but enters the electrooptic material layer. Then, light that has entered the electrooptic material layer is given an appropriate amount of retardation in the electrooptic material layer and then exits from the electrooptic material layer. At this time, the rotation direction of the circularly polarized light that enters the electrooptic material layer is a rotation direction that is not selectively reflected by the electrooptic material layer, so that selective reflection by itself does not occur according to the aspect of the invention. Thus, because the display characteristics of the electro-optical device according to the aspect of the invention does not depend on the range of selectively reflected wavelengths of the electrooptic material layer, it is not necessary to excessively add a chiral agent in order to shift the selectively reflected wavelengths from the visible light range to outside the visible light range as in the case of the existing art. Hence, it is possible to prevent deposition of the chiral agent and an increase in the driving voltage. In addition, the materials design of the electrooptic material layer become easy. Then, because the entered circularly polarized light is not selectively reflected by the electrooptic material layer, a decrease in the contrast due to the selectively reflected wavelengths being shifted into the visible light range because of a change in temperature does not occur.

In the electro-optical device according to the aspect of the invention, the electrooptic material layer may include an electrooptic material that exhibits optical anisotropy that is proportional to the square of the magnitude of the electric field applied. In the above aspect of the invention, because the electrooptic material has optical anisotropy that is proportional to the square of the magnitude of the electric field applied, the driving voltage may be lowered.

In the electro-optical device according to the aspect of the invention, the electrooptic material may include a cholesteric blue phase. In the above aspect of the invention, the cholesteric blue phase that exhibits optical isotropy when no electric field is applied and that, when an electric field is applied, exhibits optical anisotropy that is proportional to the square of the magnitude of the electric field is used.

In the electro-optical device according to the aspect of the invention, the electrooptic material may include at least one of a pseudo-isotropic phase, a smetic blue phase, a cubic phase, a smetic D phase or a micelle phase. In the above aspect of the invention, the pseudo-isotropic phase, at least one of the smetic blue phase, the cubic phase, the smetic D phase or the micelle phase that exhibits optical isotropy when no electric field is applied and that, when an electric field is applied, exhibits optical anisotropy that is proportional to the square of the magnitude of the electric field is used.

In the electro-optical device according to the aspect of the invention, the first substrate may include a pair of electrodes that apply an electric field to the electrooptic material layer. In the above aspect of the invention, using an electric field generated by applying a voltage across the pair of electrodes provided on the first substrate, optical anisotropy corresponding to the magnitude of the electric field is generated in the electrooptic material.

Another aspect of the invention provides an electronic apparatus that includes the above described electro-optical device. In the above aspect of the invention, as in the case of the above described aspects, the driving voltage is lowered, and a decrease in contrast due to a change in temperature is prevented.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
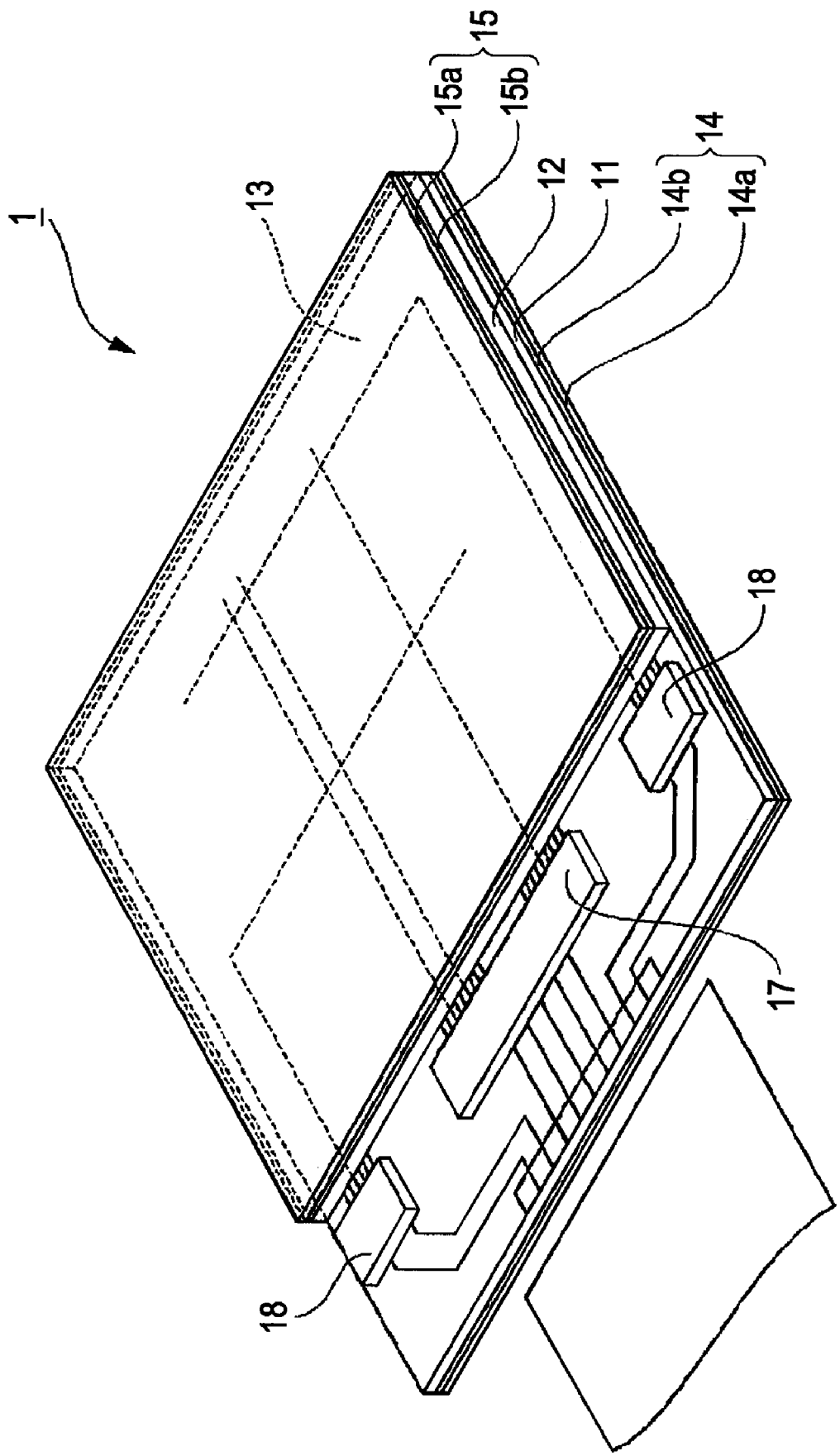
FIG. 1 is a schematic perspective view that shows a liquid crystal device according to the aspects of the invention.
Figure 2:
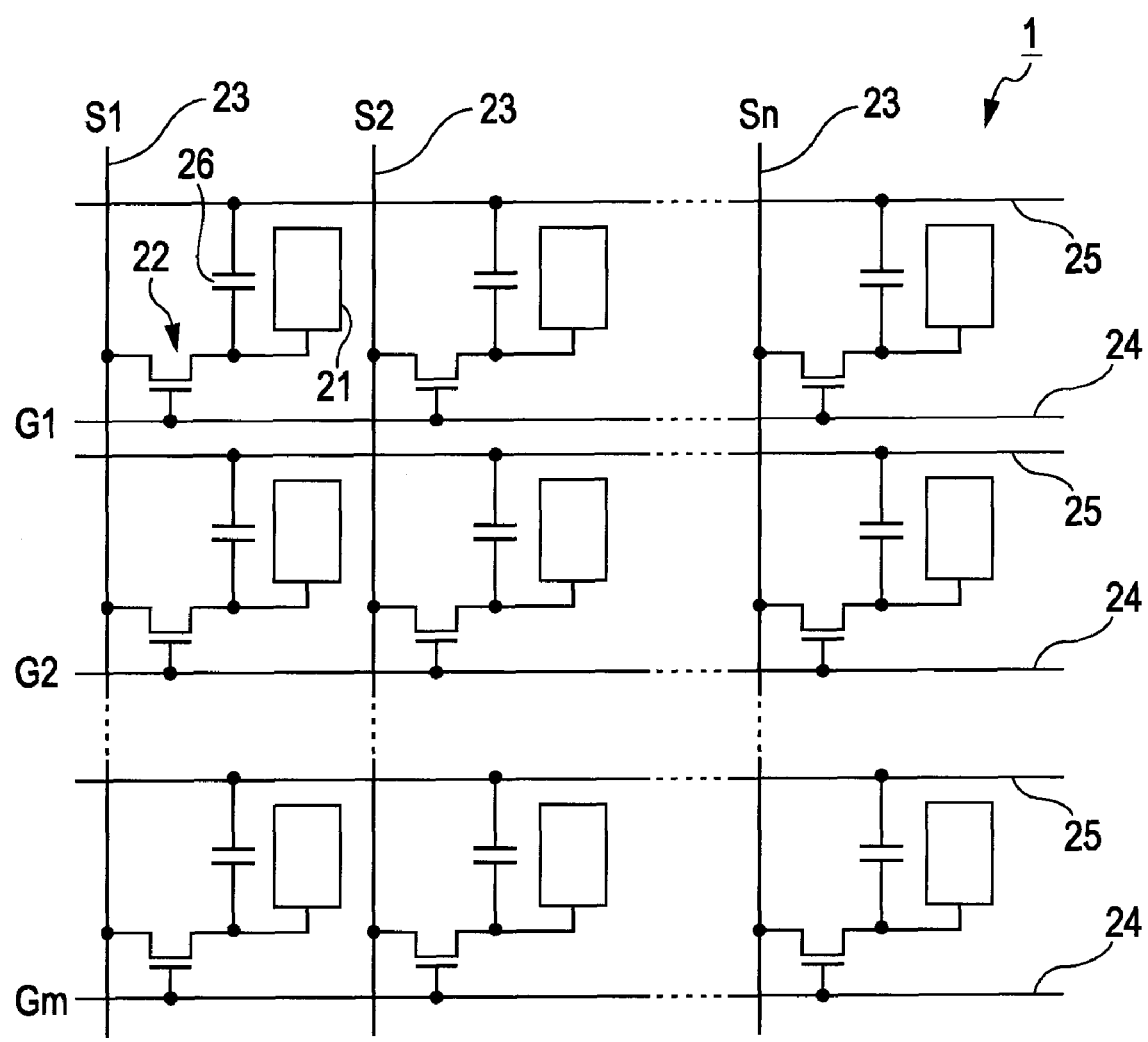
FIG. 2 is an equivalent circuit diagram of FIG. 1.
Figure 3A:
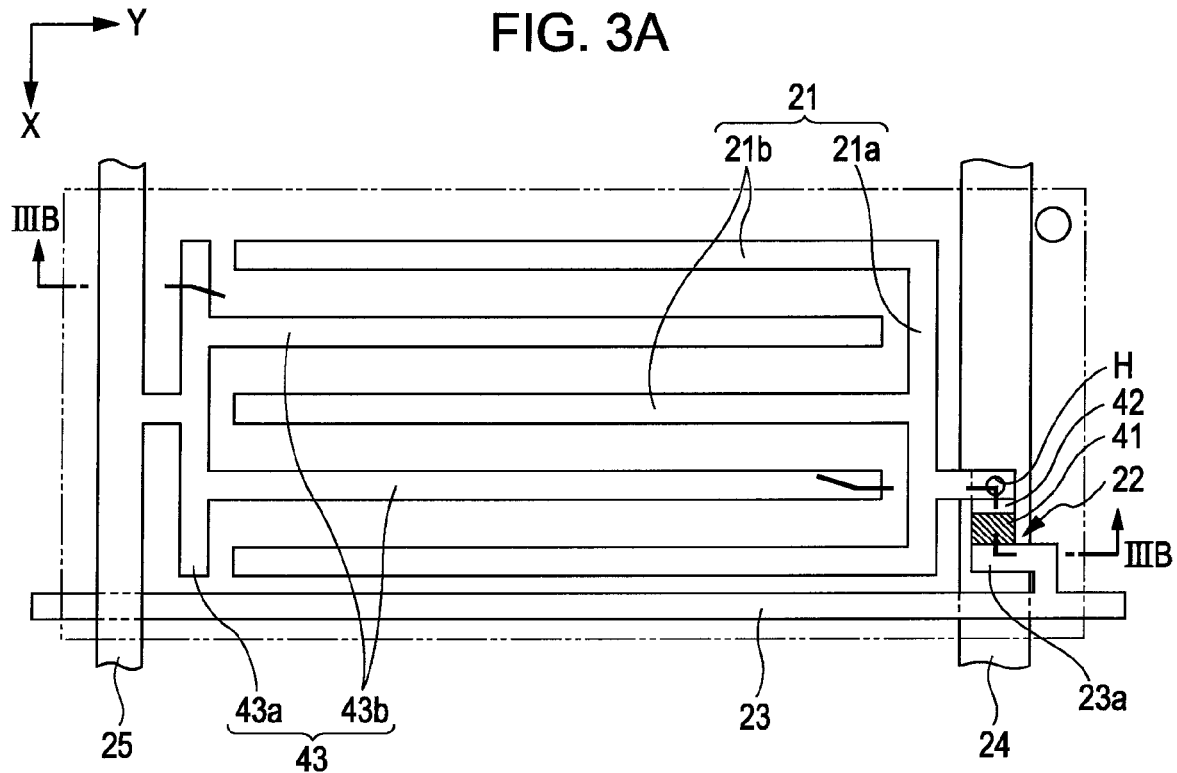
FIG. 3A is a plan view that shows a sub-pixel area.
Figure 3B:
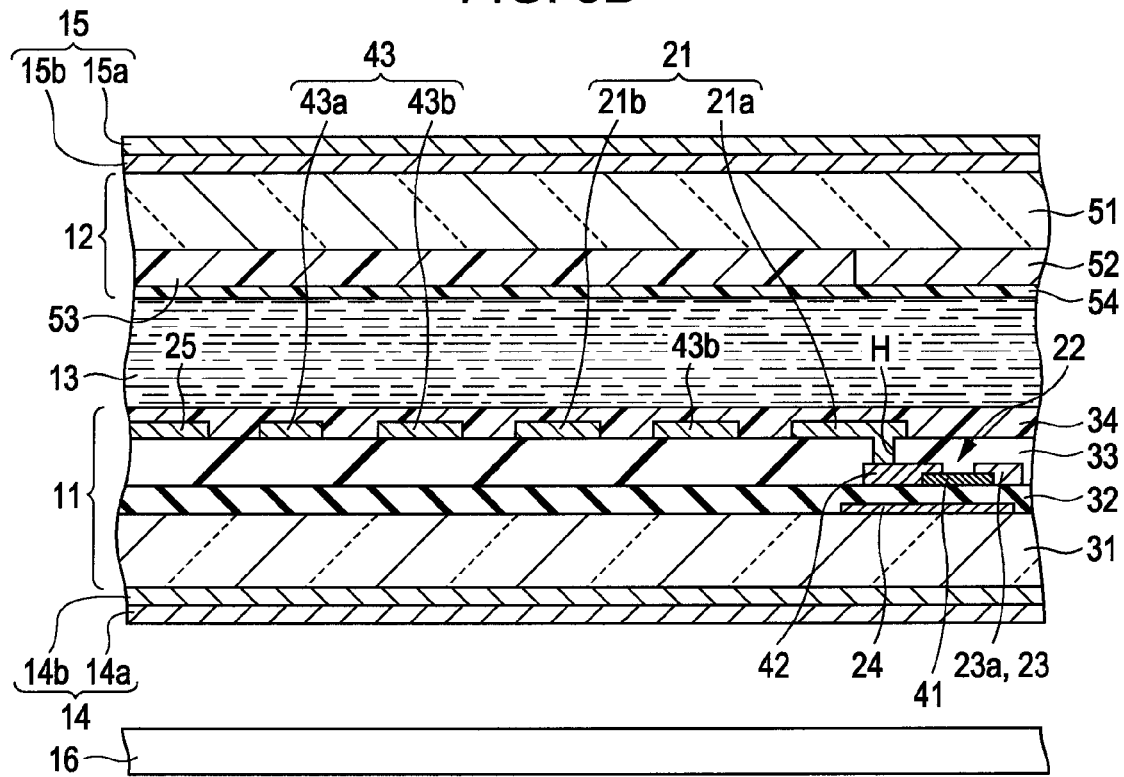
FIG. 3B is a cross-sectional view that shows the sub-pixel area.

Hereinafter, an embodiment of a liquid crystal device according to the invention will be described with reference to the accompanying drawings. Note that the scale of the drawings used in the following description is appropriately changed in order to make the components be recognizable. Here, FIG. 1 is a schematic perspective view that shows an electro-optical device. FIG. 2 is an equivalent circuit diagram of FIG. 1. FIG. 3A is a plan view that shows a pixel area. FIG. 3B is a cross-sectional view taken along the line IIIB-IIIB in FIG. 3A.

Liquid Crystal Device

The liquid crystal device (electro-optical device) 1 according to the present embodiment, as shown in FIG. 1, includes, an element substrate (first substrate) 11, an opposite substrate (second substrate) 12, and a liquid crystal layer 13 that is held between the element substrate 11 and the opposite substrate 12. In addition, the liquid crystal device 1 is formed so that the element substrate 11 and the opposite substrate 12 are adhered to each other by a frame-shaped seal material (not shown) that is provided at the outer peripheral portion of a facing area in which the element substrate 11 faces the opposite substrate 12. Then, an image display area is formed inside the seal material of the liquid crystal device 1.

In addition, the liquid crystal device 1 includes a polarizing portion (polarizing device) 14 and a polarizing portion 15. The polarizing portion 14 is provided on the outer surface side (side away from the liquid crystal layer 13) of the element substrate 11. The polarizing portion 15 is provided on the outer surface side of the opposite substrate 12. Furthermore, the liquid crystal device 1 includes an illuminating device 16 that is provided on the outer surface side of the element substrate 11 to irradiate illumination light toward the outer surface of the element substrate 11. Then, the liquid crystal device 1 includes a data line driving circuit 17 and scanning line driving circuits 18, which are semiconductor devices, such as IC chips, provided on the element substrate 11.

As shown in FIG. 2, a plurality of pixel areas are arranged in a matrix in the image display area of the liquid crystal device 1. Each of the pixel areas has three sub-pixel areas that respectively output R (red) color light, G (green) color light and B (blue) color light. In each of the plurality of sub-pixel areas, a pixel electrode (one electrode) 21, a common electrode (the other electrode) 43, which will be described later, a TFT element 22 for controlling switching of the pixel electrode 21, and a storage capacitor 26 are formed. In addition, in the image display area, a plurality of data lines 23, a plurality of scanning lines 24 and a plurality of common lines 25 are arranged in a grid.

The source of each TFT element 22 is connected to a corresponding one of the data lines 23, the gate of the TFT element 22 is connected to a corresponding one of the scanning lines 24, and the drain of the TFT element 22 is connected to the pixel electrode 21. The data lines 23 are configured to supply image signals S1 to Sn from the data line driving circuit 17 to the sub-pixel areas, respectively. In addition, the scanning lines 24 are configured to supply scanning signals G1 to Gm from the scanning line driving circuits 18 to the sub-pixel areas, respectively. Then, the common lines 25 are configured to connect the common electrodes 43 provided in the sub-pixel areas.

Next, the detailed configuration of the liquid crystal device 1 will be described. Here, the short axis direction of the substantially rectangular sub-pixel area in plan view is defined as X-axis direction, and the long axis direction is defined as Y-axis direction. The element substrate 11, as shown in FIG. 3B, includes a substrate body 31, a gate insulating film 32, an interlayer insulating film 33, and an alignment layer 34. The substrate body 31 is, for example, formed of a translucent material such as glass or quartz. The gate insulating film 32, the interlayer insulating film 33 and the alignment layer 34 are laminated in this order from the inside (the side of the liquid crystal layer 13) of the substrate body 31. In addition, the element substrate 11 includes the scanning lines 24, the data lines 23 (shown in FIG. 3A), semiconductor layers 41, drain electrodes 42, the pixel electrodes 21, the common electrodes 43 and the common lines 25. The scanning lines 24 are arranged on the inner surface of the substrate body 31. The data lines 23, the semiconductor layers 41 and the drain electrodes 42 are arranged on the inner surface of the gate insulating film 32. The pixel electrodes 21, the common electrodes 43 and the common lines 25 are arranged on the inner surface of the interlayer insulating film 33.

The gate insulating film 32 is, for example, formed of a translucent material such as $SiO_2$ (silicon oxide) and covers the scanning lines 24 formed on the substrate body 31. The interlayer insulating film 33 is, for example, formed of a translucent material such as photosensitive acrylic resin and covers the data lines 23, the semiconductor layers 41 and the drain electrodes 42, which are formed on the gate insulating film 32. The alignment layer 34 is, for example, formed of a resin material such as polyimide and covers the pixel electrodes 21, the common electrodes 43 and the common lines 25, which are formed on the interlayer insulating film 33. In addition, a rubbing process is performed on the surface of the alignment layer 34 so as to auxiliarily restrict alignment of the liquid crystal material, which forms the liquid crystal layer 13, when a voltage is applied. Here, the rubbing direction is set in the short axis direction (X direction shown in FIG. 3A) of the sub-pixel area in which an electric field is generated between the pixel electrodes 21 and the common electrodes 43. That is, the rubbing direction of the alignment layer 34 is substantially the same direction as the alignment direction of strip portions 21b and 43b, which will be described later.

As shown in FIG. 3A, the scanning lines 24 are arranged in the short axis direction (X direction) of the sub-pixel area in plan view. Then, as shown in FIG. 3A and FIG. 3B, the scanning lines 24 each overlap the channel regions of the semiconductor layers 41 via the gate insulating film 32 in plan view. As shown in FIG. 3A, the data lines 23 are arranged in the long axis direction (Y direction) of the sub-pixel area in plan view. Then, the data lines 23 each provide branching portions 23a that overlap the source regions of the semiconductor layers 41. As shown in FIG. 3A and FIG. 3B, the semiconductor layers 41 each are formed of a semiconductor such as amorphous silicon and has a channel region, which is formed by not implanting impurities, and a source region and a drain region, which are formed by implanting impurities. As shown in FIG. 3B, each of the drain electrodes 42 partially covers the drain region of the semiconductor layer 41.

As shown in FIG. 3A and FIG. 3B, the pixel electrodes 21 each are, for example, formed of a translucent conductive material such as ITO and have substantially a pectinate shape in plan view. Then, each of the pixel electrodes 21 includes a straight main line portion 21a and a plurality (three in FIG. 3A) of the strip portions 21b that are branched from the main line portion 21a, as viewed in plan. As shown in FIG. 3A, each main line portion 21a is arranged in the short axis direction (X direction) of the sub-pixel area adjacent to the scanning line 24 as viewed in plan. Then, a branching portion is provided in the main line portion 21a so as to be connected to the drain electrode 42 through a contact hole H that extends through the interlayer insulating film 33. By so doing, each pixel electrode 21 is connected to the drain region of the semiconductor layer 41. The strip portions 21b are arranged parallel to one another in the long axis direction (Y direction) of the sub-pixel area as viewed in plan.

The common electrodes 43 each are, for example, formed of a translucent conductive material such as ITO as in the case of the pixel electrode 21 and has substantially a pectinate shape in plan view. Then, each common electrode 43 includes a straight main line portion 43a and a plurality (two in FIG. 3A) of the strip portions 43b that are provided so as to be branched from the main line portion 43a. The main line portion 43a is arranged in the short axis direction (X direction) of the sub-pixel area away from the scanning line 24 with respect to the main line portion 21a as viewed in plan. Then, a branding portion is provided in the main line portion 43a so as to be connected to the common line 25. The strip portions 43b are arranged parallel to each other in the long axis direction (Y direction) of the sub-pixel area as viewed in plan. Thus, the strip portions 21b and 43b are arranged so as to be parallel to each other. Then, the strip portions 43b are arranged between the adjacent two strip portions 21b. Thus, the strip portions 21b and the strip portions 43b are alternately arranged in the short axis direction of the sub-pixel area.

Here, the interval between the strip portion 21b and the adjacent strip portion 43b becomes wider in the order from the sub-pixel area that displays red, the sub-pixel area that displays green, and the sub-pixel area that displays blue. That is, as the wavelength of color displayed in the sub-pixel area is reduced, the interval between the strip portion 21b and the adjacent strip portion 43b is increased. This is because, in the liquid crystal layer 13, the amount of retardation given to light that enters the liquid crystal layer 13 increases as the wavelength of light is reduced. Note that in the liquid crystal layer 13, the amount of retardation given to light that enters the liquid crystal layer 13 is proportional to the square of the magnitude of an electric field applied in the liquid crystal layer 13. Then, as the wavelength of color displayed in the sub-pixel area is reduced, the interval between the strip portion 21b and the adjacent strip portion 43b is increased, and the magnitude of an electric field generated between the pixel electrode 21 and the common electrode 43 is reduced. Thus, it is possible to adjust the amount of retardation given to light that enters the liquid crystal layer 13 among the sub-pixel areas of respective colors.

On the other hand, the opposite substrate 12, as shown in FIG. 3B, includes a substrate body 51, a light shielding film 52, a color filter layer 53, and an alignment layer 54. The substrate body 51 is, for example, formed of a translucent material such as glass or quartz. The light shielding film 52, the color filter layer 53 and the alignment layer 54 are sequentially laminated on the inner surface of the substrate body 51. The light shielding film 52 is formed in an area that overlaps the edge portion of the sub-pixel area in plan view on the surface of the substrate body 51 and edges the sub-pixel area. The color filter layer 53 is arranged in correspondence with each sub-pixel area. Each color filter layer 53 is, for example, formed of acrylic resin and contains a color material corresponding to color that is displayed by the sub-pixel area. The alignment layer 54, as well as the alignment layer 34, is, for example, formed of a resin material such as polyimide, and covers the color filter layers 53 and the light shielding film 52. In addition, a rubbing process is performed on the surface of the alignment layer 54. The rubbing direction is set in the short axis direction (X direction shown in FIG. 3A) of the sub-pixel area as in the case of the above.

The polarizing portion 14 includes a polarizer 14a and a quarter-wave plate 14b. The polarizer 14a transmits linearly polarized light in one direction. The quarter-wave plate 14b is provided in proximity to the element substrate 11 with respect to the polarizer 14a. By so doing, light that enters from the outer surface of the polarizing portion 14 becomes circularly polarized light that has one rotation direction. In addition, the polarizing portion 15, as well as the polarizing portion 14, includes a polarizer 15a and a quarter-wave plate 15b. The polarizer 15a transmits linearly polarized light in one direction. The quarter-wave plate 15b is provided in proximity to the opposite substrate 12 with respect to the polarizer 15a. Here, the polarizing portion 15 is configured to convert circularly polarized light, which has one rotation direction, entering from the inner surface of the polarizing portion 15 into linearly polarized light that is perpendicular to the polarization axis of the polarizer 15a by the quarter-wave plate 15b to thereby prevent transmission of light through the polarizer 15a.

The liquid crystal layer 13 is formed of a liquid crystal material that exhibits optical anisotropy that is proportional to the square of the magnitude of an electric field when the electric field is applied (showing Kerr effect). The above liquid crystal material, for example, includes a liquid crystal material that exhibits a cholesteric blue phase. Note that the dielectric constant of liquid crystal molecules in the liquid crystal layer 13 is positive (ε>0). In the above liquid crystal material, as expressed by the following Equation 1, the amount of retardation Δn is proportional to the square of an electric field E. In Equation 1, K is the Kerr coefficient, and λ is the wavelength of light.

$$\Delta n = K \lambda E^2$$

The liquid crystal material that has a cholesteric blue phase substantially exhibits optical isotropy when no electric field is applied. In the liquid crystal material that exhibits a cholesteric blue phase, liquid crystal molecules tend to align in the direction of an electric field when an electric field is applied, so that the order of alignment changes and optical anisotropy appears. Note that the liquid crystal material that exhibits a cholesteric blue phase, as described above, selectively reflects (selective reflection) light of wavelengths in accordance with the helical pitch and average refractive index of the liquid crystal material. Here, the liquid crystal layer 13 selectively reflects circularly polarized light, which has the same rotation direction as the turning direction of the helix of the liquid crystal material, within circularly polarized light that enters the liquid crystal layer 13. That is, when the twisted direction of the liquid crystal material is clockwise, clockwise circularly polarized light of wavelengths that are determined on the basis of the helical pitch and average refractive index of the liquid crystal material is selectively reflected. At this time, the liquid crystal layer 13 transmits counterclockwise circularly polarized light.

In addition, the liquid crystal layer 13 contains additive chiral agent in order to improve scattering characteristics of a pseudo-isotropic phase and development of a cholesteric blue phase. As described above, as the amount of additive chiral agent is increased, it is more likely to develop a cholesteric blue phase and reduce the helical pitch of the liquid crystal material. Thus, as the amount of additive chiral agent is increased, the wavelengths of selectively reflected light are shortened. Note that in the liquid crystal layer 13, the peak wavelength of selectively reflected light is, for example, 450 nm, which falls within the visible light range.

Operation of Liquid Crystal Device

Next, the operation of the above described liquid crystal device 1 will be described. Illumination light directed toward the outer surface of the element substrate 11 is converted into circularly polarized light by the polarizing portion 14 and then enters the liquid crystal layer 13. Here, the rotation direction of the entered circularly polarized light is reverse to the rotation direction of a circularly polarized light that is selectively reflected by the liquid crystal layer 13. Thus, the circularly polarized light enters the liquid crystal layer 13 without being selectively reflected by the liquid crystal layer 13 even when the wavelengths of light selectively reflected by the liquid crystal layer 13 fall within the visible light range.

Then, because the liquid crystal layer 13 exhibits optical isotropy when no voltage is applied between the pixel electrodes 21 and the common electrodes 43, circularly polarized light that has entered the liquid crystal layer 13 exits from the liquid crystal layer 13 by itself without changing the polarized state. Then, the exited circularly polarized light is converted into linearly polarized light, which is perpendicular to the polarization axis of the polarizer 15a, by the quarter-wave plate 15b, and is then absorbed by the polarizing portion 15. Thus, the liquid crystal device 1 performs black display when no voltage is applied between the pixel electrodes 21 and the common electrodes 43 (normally black). On the other hand, because the liquid crystal layer 13 exhibits optical anisotropy when a voltage is applied between the pixel electrodes 21 and the common electrodes 43, the circularly polarized light that has entered the liquid crystal layer 13 is converted into elliptically polarized light and then passes through the polarizing portion 15. Thus, the liquid crystal device 1 performs white display when a voltage is applied between the pixel electrodes 21 and the common electrodes 43. At this time, by providing the alignment layers 34 and 53 to the element substrate 11 and the opposite substrate 12, respectively, it is possible to easily align a liquid crystal material, which constitutes the liquid crystal layer 13, in the direction of an electric field when a voltage is applied between the pixel electrodes 21 and the common electrodes 43.

Electronic Apparatus

Figure 4:
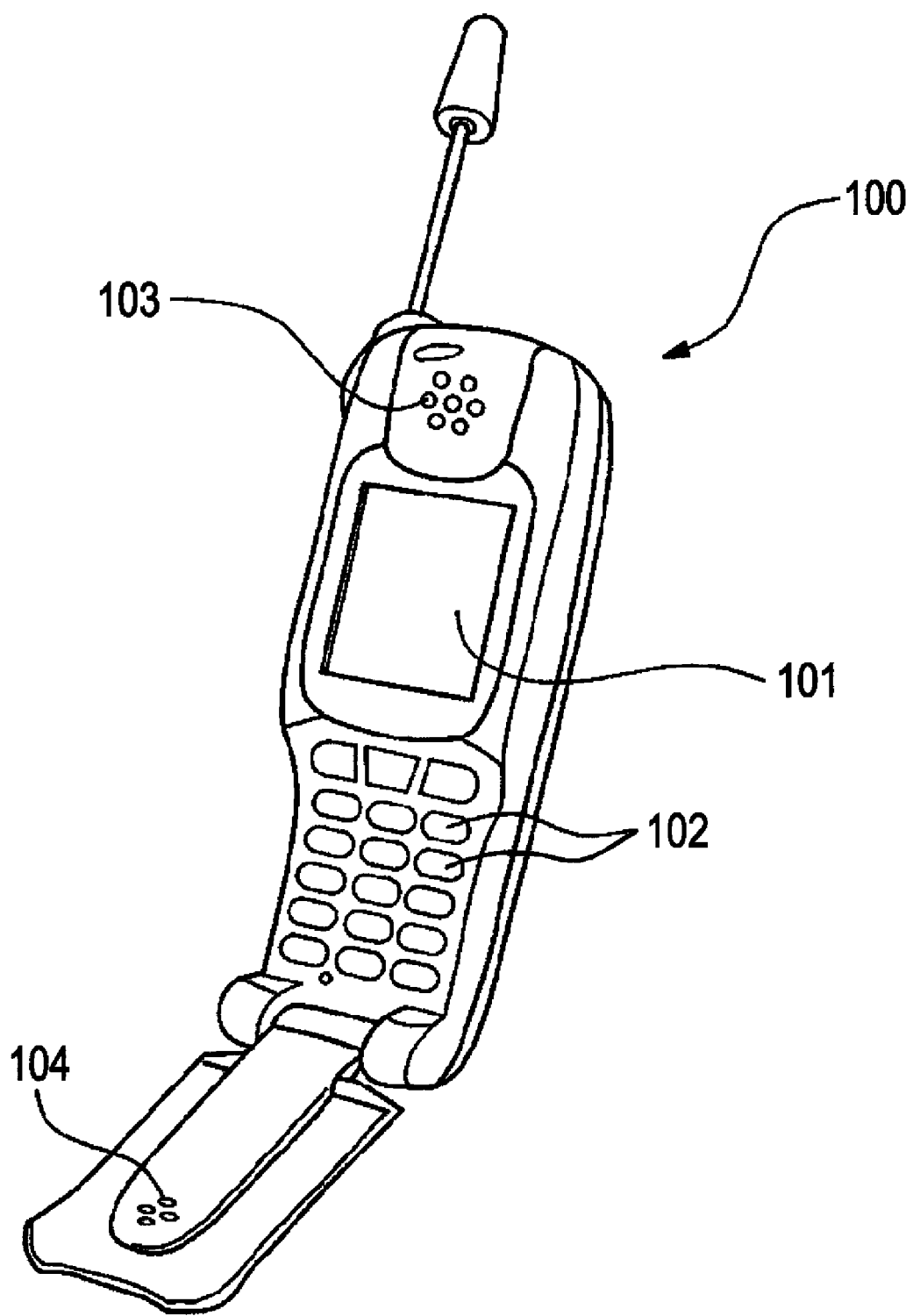
FIG. 4 is a perspective view that shows a cellular phone that includes the liquid crystal device.

The above described liquid crystal device 1 is, for example, used as a display unit 101 of a cellular phone (electronic apparatus) 100 as shown in FIG. 4. Here, FIG. 4 is a perspective view that shows the cellular phone. The cellular phone 100 includes the display unit 101, a plurality of operation buttons 102, an earpiece 103, a mouthpiece 104, and a body unit that provides the above display unit 101.

According to the above configured liquid crystal device 1 and the cellular phone 100, the rotation direction of circularly polarized light that passes through the polarizing portion 14 is set to be reverse to a rotation direction of circularly polarized light that is selectively reflected by the liquid crystal layer 13, so that it is possible to prevent selective reflection without increasing the amount of additive chiral agent. Thus, an increase in the driving voltage is suppressed, and a decrease in contrast due to a change in temperature is prevented. Here, the liquid crystal material that constitutes the liquid crystal layer 13 exhibits optical anisotropy that is proportional to the square of the magnitude of an electric field, so that the driving voltage may be further lowered.

Note that the invention is not limited to the embodiment described above, but it may be modified into various forms without departing from the scope of the invention. For example, the liquid crystal material that constitutes the liquid crystal layer is not limited to a liquid crystal material that exhibits a cholesteric blue phase; the liquid crystal layer may employ a liquid crystal material that includes at least one of a pseudo-isotropic phase, a smetic blue phase, a cubic phase, a smetic D phase or a micelle phase. In addition, as far as the electrooptic material layer is formed of an electrooptic material that exhibits optical isotropy when no electric field is applied, while exhibiting optical anisotropy corresponding to the magnitude of an electric field when the electric field is applied, the electrooptic material is not limited to the one that shows a Kerr effect that exhibits optical anisotropy that is proportional to the square of the magnitude of an electric field. Then, the alignment layers are respectively formed in the element substrate and the opposite substrate; however, as far as the liquid crystal material may be aligned when an electric field is applied, the alignment layer may be formed in only one of the substrates, or the alignment layer need not be formed in the element substrate or in the opposite substrate.

In addition, the electronic apparatus provided with the liquid crystal device is not limited to the cellular phone; it may be a projection display device such as a projector, instead. The projection display device is, for example, configured to guide light irradiated from an illuminating unit formed of an extra-high pressure mercury lamp to a liquid crystal panel formed of the element substrate, the opposite substrate and the liquid crystal layer by means of an optical system. Then, the projection display device is configured to project light that passes through the liquid crystal panel onto a screen or the like. At this time, because the opposite substrate is additionally provided with a color filter outside the liquid crystal panel, no color filter is provided therein unlike the configuration of the opposite substrate in the above described embodiment. Then, the electronic apparatus that includes the liquid crystal device is not limited to the above described cellular phone or the projection display device; it may be various electronic apparatuses, such as a PDA (personal digital assistants), a handy terminal, an electronic book, a laptop personal computer, a personal computer, a digital still camera, a liquid crystal television, a viewfinder-type or direct-view-type video tape recorder, a car navigation system, a pager, an electronic personal organizer, an electronic calculator, a word processor, a workstation, a video telephone or a POS terminal.

What is claimed is:

1. An electro-optical device comprising:
    a first substrate;
    a second substrate;
    an electro optic material layer that is held between the first substrate and the second substrate, the electro optic material layer selectively reflecting a first circularly polarized light having a first rotation direction and transmitting a second circularly polarized light having a second rotation direction that is reverse to the first rotation direction;
    a first polarizing portion provided on an outer surface of the first substrate for converting an illumination light into the second circularly polarized light having the second rotation direction;
    an illuminating device that irradiates the illumination light to an outer surface of the first substrate through the first polarizing portion; and
    a second polarizing portion provided on an outer surface of the second substrate for converting circularly polarized light from the electro optic material layer into linearly polarized light and transmitting elliptically polarized light from the electro optic material layer,
    wherein the electro optic material layer exhibits optical isotropy when no electric field is applied, and when an electric field is applied, exhibits optical anisotropy corresponding to the magnitude of the electric field.

2. The electro-optical device according to claim 1, wherein the electro optic material layer includes an electro optic material that exhibits optical anisotropy that is proportional to the square of the magnitude of the electric field applied.

3. The electro-optical device according to claim 2, wherein the electro optic material includes a cholesteric blue phase.

4. The electro-optical device according to claim 2, wherein the electrooptic material includes at least one of a pseudo-isotropic phase, a smetic blue phase, a cubic phase, a smetic D phase or a micelle phase.

5. The electro-optical device according to claim 1, wherein the first substrate includes a pair of electrodes that apply the electric field to the electro optic material layer.

6. An electronic apparatus comprising the electro-optical device according to claim 1.

7. The electro-optical device according to claim 1, wherein the first polarizing portion includes
    a first polarizer for transmitting linearly polarized light in one direction; and
    a first quarter-wave plate provided in proximity to the first substrate with respect to the first polarizer.

8. The electro-optical device according to claim 1, wherein the second polarizing portion includes:
    a second polarizer for transmitting linearly polarized light in one direction; and
    a second quarter-wave plate provided in proximity to the second substrate with respect to the second polarizer.

9. The electro-optical device according to claim 1, wherein the first substrate includes:
    a plurality of electrodes; and
    a first alignment layer covering the plurality of electrodes between the plurality of electrodes and the electro optic material layer.

10. The electro-optical device according to claim 9, wherein the first alignment layer is formed of resin material.

11. The electro-optical device according to claim 1, further comprising an image display area in which a plurality of pixel areas is arranged in a matrix, each of the pixel areas having three sub-pixel areas,
    wherein the second substrate includes:
    a color filter layer arranged in correspondence with each of the sub-pixel areas;
    a light shielding film formed in an area that overlaps edge portions of the sub-pixel areas; and
    a second alignment layer covering the color filter layer between the color filter layer and the electro optic material layer and covering the light shielding film between the light shielding film and the electro optic material layer.

12. The electro-optical device according to claim 11, wherein the second alignment layer is formed of resin material.

* * * * *